(12) United States Patent  
Szor

(10) Patent No.: US 7,487,546 B1  
(45) Date of Patent: Feb. 3, 2009

(54) HOSTS FILE PROTECTION SYSTEM AND METHOD

(75) Inventor: Peter Szor, Northridge, CA (US)

(73) Assignee: Symantec Corporation, Cupertino, CA (US)

( * ) Notice: Subject to any disclaimer, the term of this patent is extended or adjusted under 35 U.S.C. 154(b) by 889 days.

(21) Appl. No.: 10/934,532

(22) Filed: Sep. 3, 2004

(51) Int. Cl.  
    *H04L 9/00* (2006.01)

(52) U.S. Cl. .............. 726/25; 726/22; 726/23; 726/24; 713/1; 713/100; 713/188; 709/221

(58) Field of Classification Search .......... 726/25  
See application file for complete search history.

(56) References Cited

U.S. PATENT DOCUMENTS 6,839,850 B1 * 1/2005 Campbell et al. ........... 726/23  
7,111,325 B2 * 9/2006 Keohane et al. ............ 726/22  
7,152,242 B2 * 12/2006 Douglas .................... 726/23

OTHER PUBLICATIONS

Venkatakrishnan, L., et al, 'Isolated Program Execution: An Application Transparent Approach for Executing Untrusted Programs', Dec. 8-12, 2003, Dept. of Comput. Sci., Stony Brook Univ. NY, entire document, http://www.acsac.org/2003/papers/99.pdf.*

Vaxxin, 'VISE Parental Control Software' manual, Shortcut, 1997-2008, pp. 33-37, http://shortcutinc.com/cms/manuals/vise/Manual-Vise-EN.pdf.*

"Registering a Domain Name", pp. 1-3 [online]. Retrieved on Aug. 12, 2004. Retrieved from the Internet:<URL:http://www.webopedia.com/DidYouKnow/Internet/2002/DomainRegister.asp>. No author provided.

"DNS", pp. 1-4 [online]. Retrieved on Aug. 10, 2004. Retrieved from the Internet:<URL:http://www.webopedia.com/TERM/d/DNS.html>. No author provided.

"Understanding IP Addressing", pp. 1-3 [online]. Retrieved on Aug. 10, 2004. Retrieved from the Internet:<URL:http://www.webopedia.com/DidYouKnow/Internet/2002/IPaddressing.asp>. No author provided.

"IP address", pp. 1-3 [online]. Retrieved on Aug. 10, 2004. Retrieved from the Internet:<URL:http://www.webopedia.com/TERM/I/IP_address.html>. No author provided.

"domain name", pp. 1-3 [online]. Retrieved on Aug. 10, 2004. Retrieved from the Internet:>URL:http//www.webopedia.com/TERM/d/domain_name.html>. No author provided.

"What is the Hosts file?", pp. 1-2 [online]. Retrieved on May 3, 2004. Retrieved from the Internet:<URL:http://www.accs-net.com/hosts/what_is_hosts.html>. No author provided.

* cited by examiner

*Primary Examiner*—Kambiz Zand  
*Assistant Examiner*—Ronald Baum  
(74) *Attorney, Agent, or Firm*—Gunnison, McKay & Hodgson, L.L.P.; Serge J. Hodgson

(57) ABSTRACT

Modification of the hosts file is detected, implementation of the modified hosts file is stalled, the modification to the hosts file is analyzed to determine if the modification is malicious, and if the modification is malicious, the hosts file is restored. In this manner, malicious modification of the hosts file is detected and prevented before the malicious modification is ever implemented.

25 Claims, 3 Drawing Sheets

HOSTS FILE PROTECTION SYSTEM AND METHOD

BACKGROUND OF THE INVENTION

1. Field of the Invention

The present invention relates to the protection of computer systems. More particularly, the present invention relates to a method and apparatus for updating malicious code protection information on computer systems.

2. Description of Related Art

Security applications such as anti-virus applications rely upon updates from security vendor update sites. These updates are an essential component of the security applications. For example, as new viruses are created, new virus definitions are distributed as an update to allow for detection of the new viruses.

Recognizing the importance of updates to security applications, new generations of malicious code, e.g., W32.Yaha, W32.Cone, W32.HLLW.Polybot, block access to security vendor update sites by maliciously modifying the hosts file. Specifically, new generations of malicious code manage to block access to update sites by modifying the "hosts" file such that the names used by the security applications to find update sites resolve incorrectly. Usually, names are resolved to addresses using the Domain Name System (DNS); however, the hosts file can be used to override DNS resolution. Thus, malicious code can prevent security applications from obtaining updates through malicious modifications to the hosts file.

If successful in blocking access, the malicious code defeats the ability of the security applications to access and download updates from the security vendor update sites. In this manner, the malicious code reduces or eliminates the effectiveness of the security applications in protecting the host computer system.

SUMMARY OF THE INVENTION

In accordance with one embodiment, modification of the hosts file is detected, implementation of the modified hosts file is stalled, the modification to the hosts file is analyzed to determine if the modification is malicious, and if the modification is malicious, the hosts file is restored. In this manner, malicious modification of the hosts file is detected and prevented before the malicious modification is ever implemented.

Embodiments in accordance with the present invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 1:
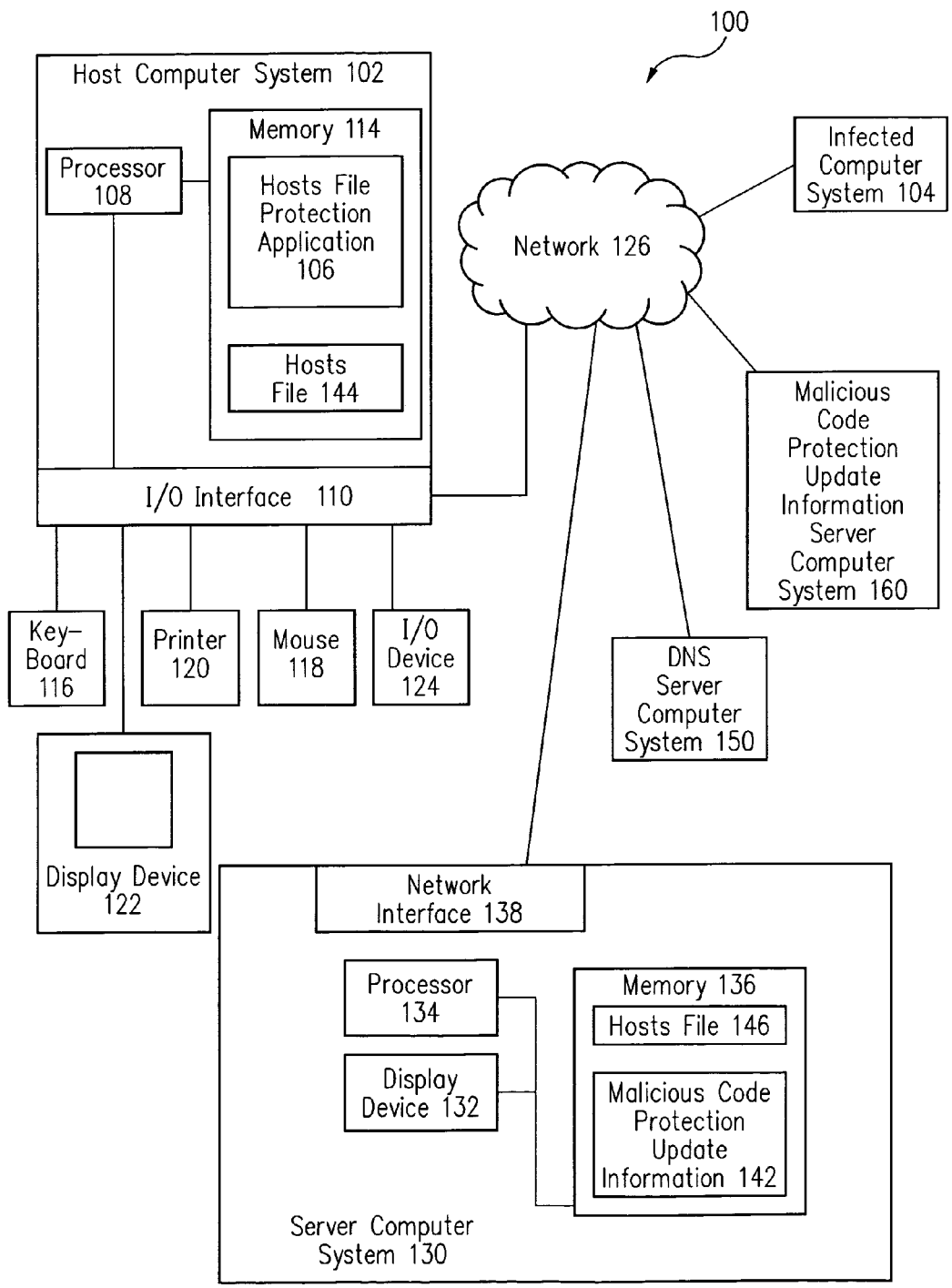
FIG. 1 is a diagram of a client-server system that includes a hosts file protection application executing on a host computer system in accordance with one embodiment of the present invention.

An IP (Internet Protocol) address is an identifier for a computer or device on a TCP/IP (Transmission Control Protocol/Internet Protocol) network. Networks using the TCP/IP protocol route messages based on the IP address of the destination. The format of an IP address is typically a 32-bit numeric address written as four numbers separated by periods. For example, 127.0.0.1 could be an IP address.

However, IP addresses are difficult for humans to remember. Thus, for the convenience of humans, domain names are commonly used instead of IP addresses.

A domain name is a name that identifies one or more IP addresses. For example, the domain name Symantec.com represents one or more IP addresses. The domain names are commonly used in URLs (Uniform Resource Locators) to identify particular web pages. For example, in the URL http://www.Symantec.com/index.html, the domain name is Symantec.com Because the Internet is based on IP addresses, not domain names, every WebServer requires a DNS (domain name system) server to translate domain names into IP addresses. For example, the domain name YourDomain.com might resolve to (translate to) 192.168.150.196.

To allow DNS servers to translate a domain name into an IP address, a domain name must be registered using an accredited registrar. Once registered, the domain name is placed into a domain name database that is used by DNS servers, sometimes called inter DNS servers or global DNS servers, to translate domain names into IP addresses.

In one embodiment, a local administrator is an accredited registrar. To illustrate, an internal DNS server, sometimes called an intra DNS server, resolves domain names into IP addresses. By registering domain names with a local administrator of a local network, domain names are resolved locally.

Generally, the host computer generates a DNS query to a DNS server, e.g., an intra or inter DNS server, to translate the domain name into the IP address. The response to the DNS query, if successfully resolved, returns the IP address of the host site associated with the domain name.

The "Hosts" file on a host computer allows domain names that are not officially registered with an accredited registrar to be resolved and it allows for an alternate resolution of a registered domain name, i.e., it allows for local override of DNS resolution. On a NT class WINDOWS® operating system, the Hosts file is located in the %System%\drivers\etc\hosts file. On most Unix based systems, the Hosts file is /etc/hosts. A hosts file, or something of similar functionality exists on nearly every operating system.

The hosts file is similar to an address book. The hosts file includes domain names, sometimes called host names, and the associated IP addresses. If the hosts file contains the domain name, the host computer system goes to the host site, i.e., accesses the site specified by the IP address, using the IP address resolved from the hosts file.

Host computers have a host address of their own, it is known as the "localhost" IP address, typically with an IP address of 127.0.0.1. More particularly, a host computer uses the IP address of 127.0.0.1 to refer to itself.

If a domain name of a host site is associated with the localhost IP address (or any other incorrect address for that host site) in the hosts file, the host site is effectively blocked because all attempts to access the host site will lead back to the host computer system (or the other incorrect address). More particularly, the domain name of the host site will be resolved to be the localhost IP address using the hosts file. The host computer will be redirected back to itself instead of to the host site, effectively blocking access to the host site.

Recognizing this usage of the hosts file, malicious code, e.g., worms such as W32.Yaha, W32.Cone, W32.HLLW.Polybot, attempt to maliciously modify the hosts file in an attempt to block access to security vendor sites. If successful in blocking access to security vendor sites, the malicious code defeats the ability of the host computer system, e.g., security applications executing thereon, to access and download updates, sometimes called malicious code protection update information, from the security vendor sites.

For example, the NORTON INTERNET SECURITY™ product includes a LIVEUPDATE™ system that automatically downloads updates, e.g., new virus definitions. The LIVEUPDATE™ system uses URLs that include domain names placed in a default update settings file. For example, the URLs include liveupdate.symantecliveupdate.com and update.Symantec.com/opt/content/onramp.

Malicious code, e.g., W32.HLLW.Polybot, attempt to maliciously modify the hosts file by attempting to add at least the following entries:

127.0.0.1 liveupdate.symantecliveupdate.com; and 127.0.0.1 update.Symantec.com;

in an attempt to block the LIVEUPDATE™ system from automatically downloading updates from liveupdate.symantecliveupdate.com and update.Symantec.com.

For example, assume the case where malicious code is successful in maliciously modifying the hosts file to add the entries:

127.0.0.1 liveupdate.symantecliveupdate.com; and 127.0.0.1 update.Symantec.com.

In this example, when the LIVEUPDATE™ system goes to download updates from liveupdate.symantecliveupdate.com, the host computer system is redirected back to itself thus defeating the download. The LIVEUPDATE™ system then attempts to download updates from update.Symantec.com as an alternative to liveupdate.symantecliveupdate.com. Again, the host computer system is redirected back to itself thus defeating the download. As a net result, the host computer system is unable to download the updates.

Although specific examples of blocking access to a host site by using the localhost IP address of 127.0.0.1 are set forth herein, any IP address that does not map to the host site, sometimes called a misleading IP address, can be inserted in the hosts file to block access. More particularly, instead of downloading updates, the host computer system is redirected to the misleading IP address thus defeating the download. For example, a misleading IP address of 0.0.0.0 is sometimes used by malicious code.

Figure 2:
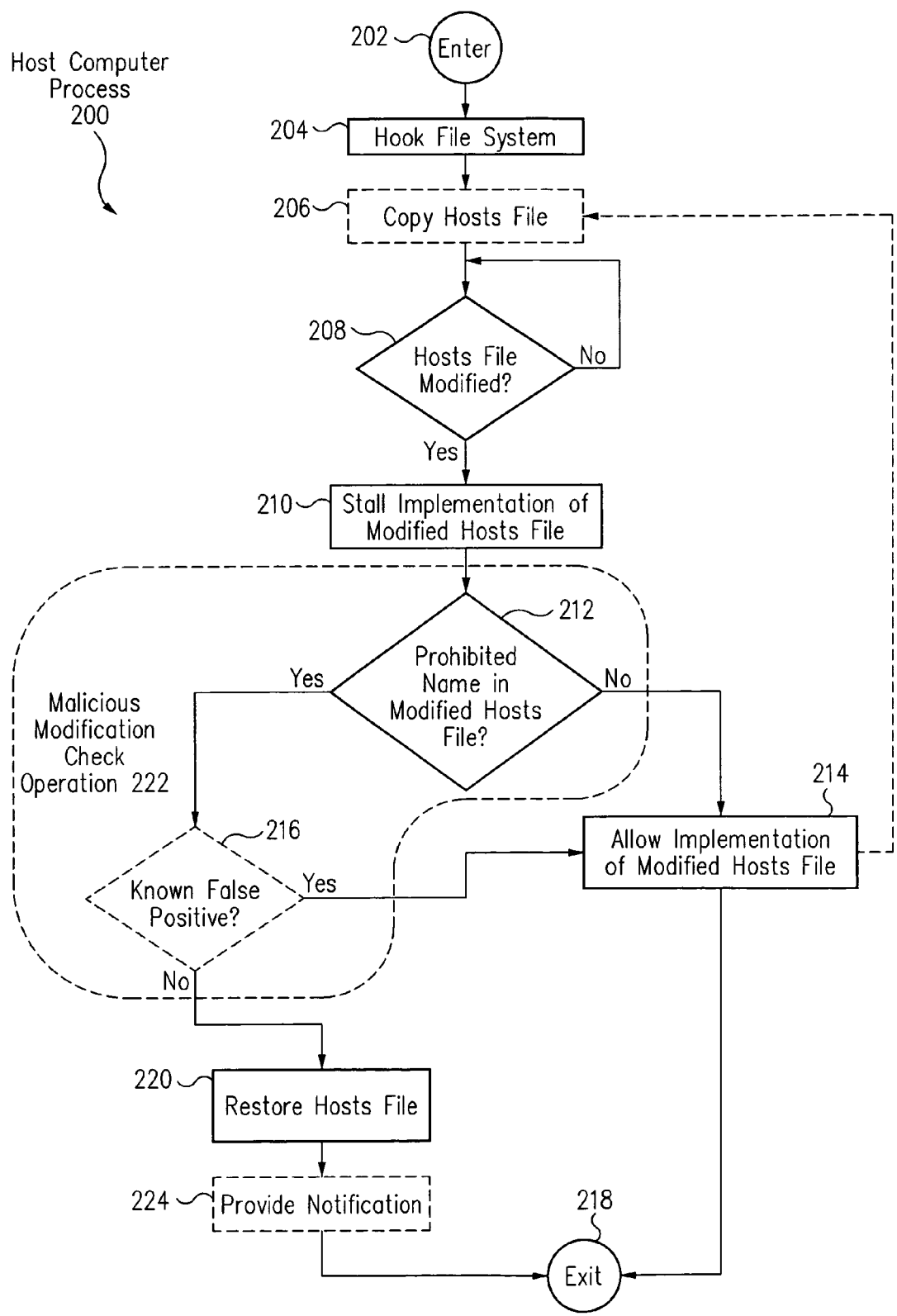
FIG. 2 is a flow diagram of a host computer process in accordance with one embodiment of the present invention.

Thus, referring to FIG. 2, in accordance with one embodiment of the present invention, modification of the hosts file is detected in a HOSTS FILE MODIFIED CHECK OPERATION 208, implementation of the modified hosts file is stalled in a STALL IMPLEMENTATION OF MODIFIED HOSTS FILE OPERATION 210, the modification to the hosts file is analyzed to determine if the modification is malicious in a MALICIOUS MODIFICATION CHECK OPERATION 222, and if the modification is malicious, the hosts file is restored in a RESTORE HOSTS FILE OPERATION 220. In this manner, malicious modification of the hosts file is detected and prevented before the malicious modification is ever implemented.

More particularly, FIG. 1 is a diagram of a client-server system 100 that includes a hosts file protection application 106 executing on a host computer system 102, e.g., a first computer system, in accordance with one embodiment of the present invention.

Host computer system 102, sometimes called a client or user device, typically includes a central processing unit (CPU) 108, hereinafter processor 108, an input output (I/O) interface 110, and a memory 114. In one embodiment, host computer system 102 includes a Windows® operating system.

Memory 114 further includes a hosts file 144. Hosts file 144 includes domain names, sometimes called host names, and the associated IP addresses. Hosts files such as hosts file 144 are well known to those of skill in the art.

Host computer system 102 may further include standard devices like a keyboard 116, a mouse 118, a printer 120, and a display device 122, as well as, one or more standard input/output (I/O) devices 124, such as a compact disk (CD) or DVD drive, floppy disk drive, or other digital or waveform port for inputting data to and outputting data from host computer system 102. In one embodiment, hosts file protection application 106 is loaded into host computer system 102 via I/O device 124, such as from a CD, DVD or floppy disk containing hosts file protection application 106.

Host computer system 102 is coupled to a server computer system 130 of client-server system 100 by a network 126. Server computer system 130 typically includes a display device 132, a processor 134, a memory 136, and a network interface 138. In accordance with one embodiment, memory 136 of server computer system 130 includes a hosts file 146.

Further, host computer system 102 is also coupled to an infected computer system 104, a malicious code protection update information server computer system 160, and a DNS server computer system 150 by network 126. In one embodiment, infected computer system 104, malicious code protection update information server computer system 160, and DNS server computer system 150 are similar to host computer system 102 and/or server computer system 130, for example, include a central processing unit, an input output (I/O) interface, and a memory.

Infected computer system 104, malicious code protection update information server computer system 160, and DNS server computer system 150 may further include standard devices like a keyboard, a mouse, a printer, a display device and an I/O device(s). The various hardware components of infected computer system 104, malicious code protection update information server computer system 160, and DNS server computer system 150 are not illustrated to avoid detracting from the principles of the invention.

Illustratively, malicious code is propagated from infected computer system 104 to host computer system 102. In one embodiment, malicious code is defined as any computer program, module, set of modules, or code that enters a computer system without an authorized user's knowledge and/or without an authorized user's consent.

Network 126 can be any network or network system that is of interest to a user. In various embodiments, network interface 138 and I/O interface 110 include analog modems, digital modems, or a network interface card.

Hosts file protection application 106 is stored in memory 114 of host computer system 102 and executed on host computer system 102. The particular type of and configuration of host computer system 102, infected computer system 104, malicious code protection update information server computer system 160, DNS server computer system 150, and server computer system 130 are not essential to this embodiment of the present invention.

FIG. 2 is a flow diagram of a host computer process 200 in accordance with one embodiment of the present invention. Referring now to FIGS. 1 and 2 together, execution of hosts file protection application 106 by processor 108 results in the operations of host computer process 200 as described below in one embodiment.

From an ENTER OPERATION 202, flow moves to a HOOK FILE SYSTEM OPERATION 204. In HOOK FILE SYSTEM OPERATION 204, the file system of the host computer system is hooked. Generally, the file system of the host computer system is hooked by redirecting control to hosts file protection application 106 upon the occurrence of a file system event, e.g., writing to a file.

In accordance with one particular embodiment, the file system of host computer system 102 is hooked by redirecting control to hosts file protection application 106 upon the occurrence of writing to hosts file 144 in HOOK FILE SYSTEM OPERATION 204. Hooking of a file system is well known to those of skill in the art and so is not discussed in detailed to avoid detracting from the principles the invention.

From HOOK FILE SYSTEM OPERATION 204, flow moves, optionally, to a COPY HOSTS FILE OPERATION 206. In COPY HOSTS FILE OPERATION 206, a copy of the hosts file, e.g., hosts file 144, is made, sometimes called created. In accordance with one embodiment, this copy of the hosts file is used to restore the hosts file as discussed further below in regards to a RESTORE HOSTS FILE OPERATION 220. However, as also discussed further below, the hosts file can be restored using other techniques not requiring a copy of the hosts file. Accordingly, COPY HOSTS FILE OPERATION 206 is optional and in one embodiment is not performed.

From COPY HOSTS FILE OPERATION 206 (or directly from HOOK FILE SYSTEM OPERATION 204 if COPY HOSTS FILE OPERATION 206 is not perform), flow moves to a HOSTS FILE MODIFIED CHECK OPERATION 208. In HOSTS FILE MODIFIED CHECK OPERATION 208, a determination is made as to whether the hosts file, e.g., hosts file 144, has been modified. If the hosts file has not been modified, flow remains at HOSTS FILE MODIFIED CHECK OPERATION 208. Conversely, if the hosts file has been modified, flow moves to a STALL IMPLEMENTATION OF MODIFIED HOSTS FILE OPERATION 210. Modification of the hosts file creates a modified hosts file.

In accordance with one embodiment, upon writing to hosts file 144, a determination is made that the hosts file has been modified in HOSTS FILE MODIFIED CHECK OPERATION 208. As discussed above, the file system of host computer system 102 is hooked in HOOK FILE SYSTEM OPERATION 204 such that control transfers to hosts file protection application 106 upon writing to hosts file 144.

Thus, upon modification of the hosts file, flow moves to STALL IMPLEMENTATION OF MODIFIED HOSTS FILE OPERATION 210. In STALL IMPLEMENTATION OF MODIFIED HOSTS FILE OPERATION 210, implementation of the modified hosts file is stalled. In one embodiment, the use of the modified hosts file, e.g., by another application, is prevented. As set forth above, control is transferred to hosts file protection application 106, which prevents control from being transferred to another application that would use the modified hosts file.

For example, hosts file 144 is modified to create a modified hosts file. Implementation of the modified hosts file is stalled in STALL IMPLEMENTATION OF MODIFIED HOSTS FILE OPERATION 210.

From STALL IMPLEMENTATION OF MODIFIED HOSTS FILE OPERATION 210, flow moves to a PROHIBITED NAME IN MODIFIED HOSTS FILE CHECK OPERATION 212. In PROHIBITED NAME IN MODIFIED HOSTS FILE CHECK OPERATION 212, a determination is made as to whether the hosts file has been modified to include a prohibited name, i.e., whether an entry including a prohibited name has been inserted into the hosts file. Stated another way, in PROHIBITED NAME IN MODIFIED HOSTS FILE CHECK OPERATION 212, a determination is made as to whether the modified hosts file includes a prohibited name.

If a determination is made that a prohibited name has not been inserted into the hosts file, flow moves from PROHIBITED NAME IN MODIFIED HOSTS FILE CHECK OPERATION 212 to an ALLOW IMPLEMENTATION OF MODIFIED HOSTS FILE OPERATION 214. Conversely, if a determination is made that a prohibited name has been inserted into the hosts file, flow moves from PROHIBITED NAME IN MODIFIED HOSTS FILE CHECK OPERATION 212 to, optionally, a KNOWN FALSE POSITIVE CHECK OPERATION 216.

In one embodiment, hosts file protection application 106 includes a list of prohibited names, sometimes called a prohibited list. In various embodiments, the prohibited list is a user defined or downloaded list. In one specific embodiment, the prohibited list is periodically updated, e.g., by periodically downloading an update.

In one embodiment, a prohibited name includes a name of a security vendor site. Generally, security vendor sites include sites, e.g., Web sites and/or FTP sites, of security vendors. Examples of security vendor sites include sites for receiving updates to security products, e.g., new virus definitions. In one particular embodiment, security vendor sites include sites of Symantec Corporation.

Other examples of security vendor sites include sites for receiving updates to operating systems or applications, e.g., patches or upgrades to operating systems or applications.

Below is a listing on the names placed by W32.HLLW.Polybot in the hosts file:

www.symantec.com securityresponse.symantec.com symantec.com www.sophos.com sophos.com sophos.com www.mcafee.com mcafee.com liveupdate.symantecliveupdate.com www.viruslist.com viruslist.com viruslist.com f-secure.com www.f-secure.com kaspersky.com www.avp.com www.kaspersky.com avp.com 1www.networkassociates.com networkassociates.com www.ca.com ca.com mast.mcafee.com my-etrust.com www.my-etrust.com download.mcafee.com dispatch.mcafee.com secure.nai.com nai.com www.nai.com update.symantec.com updates.symantec.com us.mcafee.com liveupdate.symantec.com customer.symantec.com rads.mcafee.com trendmicro.com www.trendmicro.com In accordance with one embodiment, if the hosts file is modified to add one or more of the names placed by W32.HLLW.Polybot in the hosts file, a determination is made that a prohibited name has been inserted into the hosts file in PROHIBITED NAME IN MODIFIED HOSTS FILE CHECK OPERATION 212.

Below is a listing on the names placed by W32.Cone family in the hosts file:

securityresponse.symantec.com symantec.com www.sophos.com sophos.com www.mcafee.com mcafee.com liveupdate.symantecliveupdate.com www.viruslist.com viruslist.com viruslist.com f-secure.com www.f-secure.com kaspersky.com www.avp.com www.kaspersky.com avp.com www.networkassociates.com networkassociates.com www.ca.com ca.com mast.mcafee.com my-etrust.com www.my-etrust.com download.mcafee.com dispatch.mcafee.com secure.nai.com nai.com www.nai.com microsoft.com www.microsoft.com support.microsoft.com update.symantec.com updates.symantec.com us.mcafee.com liveupdate.symantec.com customer.symantec.com rads.mcafee.com trendmicro.com www.trendmicro.com localhost In accordance with one embodiment, if the hosts file is modified to add one or more of the names placed by W32.Cone family in the hosts file, a determination is made that a prohibited name has been inserted into the hosts file in PROHIBITED NAME IN MODIFIED HOSTS FILE CHECK OPERATION 212.

As set forth above, if a determination is made that a prohibited name has not been inserted into the hosts file, flow moves to ALLOW IMPLEMENTATION OF MODIFIED HOSTS FILE OPERATION 214. In ALLOW IMPLEMENTATION OF MODIFIED HOSTS FILE OPERATION 214, implementation of the modified hosts file is allowed. Recall that the implementation of the modified hosts file was stalled in STALL IMPLEMENTATION OF MODIFIED HOSTS FILE OPERATION 210. For example, implementation of the modification to hosts file 144 is allowed in ALLOW IMPLEMENTATION OF MODIFIED HOSTS FILE OPERATION 214.

In one embodiment, the use of the modified hosts file, e.g., by another application, is allowed. For example, control is transferred from hosts file protection application 106 to another application that uses the modified hosts file.

In accordance with this embodiment, because the hosts file has not been modified to include a prohibited name, the modification of the hosts file is not malicious, i.e., is not associated with malicious code. Specifically, a modification to the hosts file to block security vendor sites has not been made. Accordingly, security vendor sites can be accessed, for example, to download malicious code protection update information therefrom.

From ALLOW IMPLEMENTATION OF MODIFIED HOSTS FILE OPERATION 214, flow moves to and exits at an EXIT OPERATION 218 or returns to HOSTS FILE MODIFIED CHECK OPERATION 208 to await the next modification to the hosts file.

In one embodiment, from ALLOW IMPLEMENTATION OF MODIFIED HOSTS FILE OPERATION 214, flow returns to COPY HOSTS FILE OPERATION 206 as indicated by the dashed arrow. COPY HOSTS FILE OPERA- TION 206 is performed as discussed above and a copy of the modified hosts file is made. In accordance with one embodiment, this copy of the modified hosts file, which now becomes the hosts file, is used to restore the hosts file as discussed further below in regards to RESTORE HOSTS FILE OPERATION 220. However, as also discussed further below, the hosts file can be restored using other techniques not requiring a copy of the hosts file. Accordingly, COPY HOSTS FILE OPERATION 206 is optional and in one embodiment is not performed.

Returning again to PROHIBITED NAME IN MODIFIED HOSTS FILE CHECK OPERATION 212, if a determination is made that a prohibited name has been inserted into the hosts file, flow moves to, optionally, KNOWN FALSE POSITIVE CHECK OPERATION 216. In KNOWN FALSE POSITIVE CHECK OPERATION 216, a determination is made as to whether the modification of the hosts file is a known false positive. Generally, a known false positive is when the hosts file is modified to include a prohibited name, but the modification of the hosts file is in fact not malicious, e.g., is not associated with malicious code.

If a determination is made that the modification to the hosts file is a known false positive, flow moves to ALLOW IMPLEMENTATION OF MODIFIED HOSTS FILE OPERATION 214, which is performed as discussed above. Conversely, if a determination is made that the modification to the hosts file is not a known false positive, flow moves from KNOWN FALSE POSITIVE CHECK OPERATION 216 to a RESTORE HOSTS FILE OPERATION 220.

In one embodiment, the IP address associated with the prohibited name inserted into the hosts file is checked in KNOWN FALSE POSITIVE CHECK OPERATION 216. More particularly, if the IP address is a known safe IP address, e.g., is on an exclusion list, a determination is made that the modification of the hosts file is a known false positive in KNOWN FALSE POSITIVE CHECK OPERATION 216.

To illustrate, the hosts file is modified to include a prohibited name for a non-malicious, sometimes call legitimate, reason. For example, a network is configured to include a security update server. This security update server retrieves updates from security vendor sites. Host computer systems of the network are redirected from the security vendor sites to the security update server of the network to retrieve updates by modifying the hosts file. In this manner, host computer systems on the network are updated locally and without requiring each host computer system to retrieve updates from security vendor sites.

For example, server computer system 130 includes malicious code protection update information 142 in memory 136. Illustratively, malicious code protection update information 142 includes information used by security applications, for example, includes virus definitions. Malicious code protection update information 142 is downloaded from malicious code protection update information server computer system 160, e.g., located at a security vendor site having a prohibited name.

Hosts file 144 on host computer system 102 is modified to associate the prohibited name of malicious code protection update information server computer system 160 with the IP address of server computer system 130. Accordingly, when host computer system 102 goes to access malicious code protection update information server computer system 160, host computer system 102 is redirected to server computer system 130 by the entry (modification) in hosts file 144. Due to this redirection, host computer system 102 receives malicious code protection update information 142 from server computer system 130, i.e., locally.

Thus, in KNOWN FALSE POSITIVE CHECK OPERATION 216, the IP address associated with the prohibited name inserted into hosts file 144 is determined to be the IP address of server computer system 130, which is a known safe IP address. For example, the IP address of server computer system 130 is on an exclusion list of known safe IP addresses. Accordingly, a determination is made that the malicious modification to hosts file 144 is a known false positive, and flow moves to ALLOW IMPLEMENTATION OF MODIFIED HOSTS FILE OPERATION 214.

In another embodiment, the hosts file of a first host computer system is modified to redirect the first host computer system to a hosts file on a second computer system. This redirection may occur multiple times. For example, the second computer system may be redirected to a hosts file on a third computer system, and so on.

In accordance with this embodiment, a query is made, e.g., using an application programming interface (API), to determine the IP address associated with the prohibited name. If the returned IP address is a known safe IP address, a determination is made that the presence of the prohibited name in the hosts file is a known false positive, and flow moves to ALLOW IMPLEMENTATION OF MODIFIED HOSTS FILE OPERATION 214, which is performed as discussed above.

To illustrate, a prohibited name inserted into hosts file 144 on host computer system 102 is associated with hosts file 146 of server computer system 130. Hosts file 146 of server computer system 130, in turn, associate the prohibited name with the IP address of malicious code protection update information server computer system 160, i.e., a known safe IP address. Accordingly, in KNOWN FALSE POSITIVE CHECK OPERATION 216, a query is made to resolve the prohibited name inserted into hosts file 144, and in response to this query, the IP address of malicious code protection update information server computer system 160 is returned. This returned IP address is found on an exclusion list of known safe IP addresses, and a determination is made that the presence of a prohibited name in hosts file 144 is a known false positive, and flow moves to ALLOW IMPLEMENTATION OF MODIFIED HOSTS FILE 214.

Although PROHIBITED NAME IN MODIFIED HOSTS FILE CHECK OPERATION 212 and KNOWN FALSE POSITIVE CHECK OPERATION 216 are set forth as separate operations above, in one embodiment, PROHIBITED NAME IN MODIFIED HOSTS FILE CHECK OPERATION 212 and KNOWN FALSE POSITIVE CHECK OPERATION 216 are part of a single operation, i.e., are part of a MALICIOUS MODIFICATION CHECK OPERATION 222. As discussed further below with reference to FIG. 3, if a determination is made in MALICIOUS MODIFICATION CHECK OPERATION 222 that the modification to the hosts file is non-malicious, flow moves to ALLOW IMPLEMENTATION OF MODIFIED HOSTS FILE OPERATION 214. Conversely, if a determination is made in MALICIOUS MODIFICATION CHECK OPERATION 222 that the modification to the hosts file is malicious, flow moves to RESTORE HOSTS FILE OPERATION 220.

However, returning to KNOWN FALSE POSITIVE CHECK OPERATION 216, if a determination is made that the presence of a prohibited name in the hosts file is not a known false positive (or directly from PROHIBITED NAME IN MODIFIED HOSTS FILE CHECK OPERATION 212 if KNOWN FALSE POSITIVE CHECK OPERATION 216 is not performed), flow moves to RESTORE HOSTS FILE OPERATION 220.

In RESTORE HOSTS FILE OPERATION 220, the hosts file is restored and the restored hosts file is implemented. In various embodiments, the hosts file is restored by replacing the modified hosts file with the hosts file prior to modification, or by deleting the malicious entries in the modified hosts file.

In one embodiment, COPY HOSTS FILE OPERATION 206 has been performed such that a copy of the hosts file prior to modification exist. The modified hosts file is deleted and replaced with the existing copy of the hosts file prior to modification. If not already implemented, the existing copy of the hosts file is implemented.

In another embodiment, the prohibited name(s) and associated IP address(es), sometimes called the malicious entry (ies), in the modified hosts file are deleted. In this manner, non-malicious modifications of the hosts file are allowed, while malicious entries are disallowed. The modified hosts file absent the malicious entries is implemented, e.g., in a manner similar to that discussed in allow implementation of modified hosts file operation 214.

Thus, in accordance with one embodiment of the present invention, modification of the hosts file is detected, implementation of the modified hosts file is stalled, the modification to the hosts file is analyzed to determine if the modification is malicious, and if the modification is malicious, the hosts file is restored. In this manner, malicious modification of the hosts file is detected and prevented before the malicious modification is ever implemented.

From RESTORE HOSTS FILE OPERATION 220, flow moves, optionally, to a PROVIDE NOTIFICATION OPERATION 224. In PROVIDE NOTIFICATION OPERATION 224, the user of host computer system 102 and/or the administrator are notified that an attempt to maliciously modify the hosts file has been defeated and the hosts file has been restored on host computer system 102. The user and/or administrator can be notified using any one of a number of techniques, e.g., by using a pop up window, by writing to a file and/or otherwise by logging the event.

From PROVIDE NOTIFICATION OPERATION 224 (or directly from RESTORE HOSTS FILE OPERATION 220), flow moves to and exits at EXIT OPERATION 218 or returns to HOSTS FILE MODIFIED CHECK OPERATION 208 and awaits the next modification of the hosts file.

In the above manner, the ability of malicious code to successfully block access to security vendor sites is defeated. Specifically, by disallowing maliciously entries into the hosts file to redirect the host computer system back to itself (or other misleading IP address), the ability of malicious code to block a host computer system from accessing and downloading updates from security vendor sites is defeated.

Figure 3:
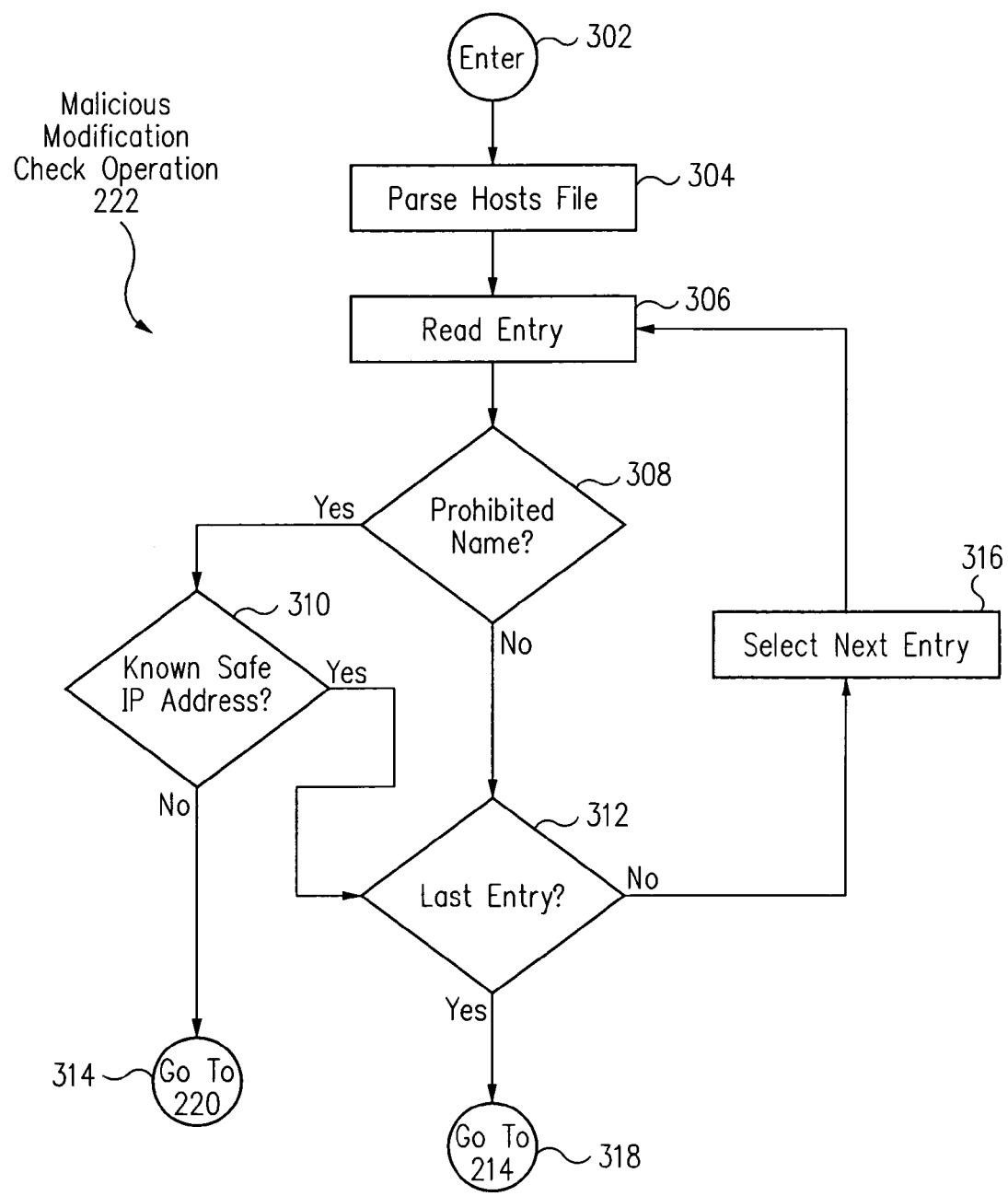
FIG. 3 is a flow diagram of a malicious modification check operation of the host computer process of FIG. 2 in accordance with one embodiment of the present invention.

FIG. 3 is a flow diagram of MALICIOUS MODIFICATION CHECK OPERATION 222 of host computer process 200 of FIG. 2 in accordance with one embodiment of the present invention. Referring now to FIGS. 2 and 3 together, from an ENTER OPERATION 302 (and from STALL IMPLEMENTATION OF MODIFIED HOSTS FILE OPERATION 210 of FIG. 2), flow moves to a PARSE HOSTS FILE OPERATION 304. In PARSE HOSTS FILE OPERATION 304, the hosts file is parsed into entries creating a parsed hosts file. Further, in one embodiment, each entry is parsed into a host name and an IP address. Parsing of a file is well known to those of skill in the art and so is not discussed further to avoid detracting from the principles of the invention.

In one embodiment, the hosts file contains the mapping of IP addresses to hosts names. Each entry in the hosts file is kept on an individual line. The IP address is placed in the first column followed by the corresponding host name. The IP address and the host name are separated by at least one space. Additionally, comments are inserted on individual lines or following the host name denoted by a '#' symbol.

From PARSE HOSTS FILE OPERATION 304, flow moves to a READ ENTRY OPERATION 306. In READ ENTRY OPERATION 306, an entry is read from the parsed hosts file.

From READ ENTRY OPERATION 306, flow moves to a PROHIBITED NAME CHECK OPERATION 308. In PROHIBITED NAME CHECK OPERATION 308, a determination is made as to whether the host name in the entry read in READ ENTRY OPERATION 306 is a prohibited name.

In one embodiment, the host name is compared to a prohibited list of prohibited names. If the host name is on the prohibited list, a determination is made that the host name in the entry read in READ ENTRY OPERATION 306 is a prohibited name although other techniques are used in other embodiments.

If a determination is made that the host name is a prohibited name, flow moves from PROHIBITED NAME CHECK OPERATION 308 to a KNOWN SAFE IP ADDRESS CHECK OPERATION 310. Conversely, if a determination is made that the host name is not a prohibited name, flow moves from PROHIBITED NAME CHECK OPERATION 308 to a LAST ENTRY CHECK OPERATION 312.

In KNOWN SAFE IP ADDRESS CHECK OPERATION 310, a determination is made as to whether the IP address of the entry read in READ ENTRY OPERATION 306 is a known safe IP address. In one embodiment, the IP address is compared to a known safe IP address list of known safe IP addresses. If the IP address is on the known safe IP address list, a determination is made that the IP address in the entry read in READ ENTRY OPERATION 306 is a known safe IP address although other techniques are used in other embodiments.

If a determination is made that the IP address is a known safe IP address, flow moves from KNOWN SAFE IP ADDRESS CHECK OPERATION 310 to LAST ENTRY CHECK OPERATION 312. Conversely, if a determination is made that the IP address is not a known safe IP address, flow moves from KNOWN SAFE IP ADDRESS CHECK OPERATION 310 to RESTORE HOSTS FILE OPERATION 220 through an OPERATION 314. In this event, the hosts file has been modified to include a prohibited name that is not associated with a known safe IP address, i.e., the hosts file has been maliciously modified. Thus, the hosts file is restored in RESTORE HOSTS FILE OPERATION 220 as discussed above.

However, if the entry does not include a prohibited name or includes a prohibited name that is associated with a known safe IP address, flow moves to LAST ENTRY CHECK OPERATION 312. In LAST ENTRY CHECK OPERATION 312, a determination is made as to whether the present entry is the last entry in the parsed hosts file, i.e., whether OPERATIONS 306, 308, and sometimes OPERATION 310, have been performed on every entry in the parsed hosts file.

If a determination is made that the present entry is not the last entry in the parsed hosts file, flow moves from LAST ENTRY CHECK OPERATION 312 to a SELECT NEXT ENTRY OPERATION 316. In SELECT NEXT ENTRY OPERATION 316, the next entry from the parsed hosts file is selected. Operations 306, 308, and sometimes 310, are performed upon this selected next entry in a manner similar to that discussed above.

However, if a determination is made that the present entry is the last entry in the parsed hosts file, flow moves from LAST ENTRY CHECK OPERATION 312 to ALLOW IMPLEMENTATION OF MODIFIED HOSTS FILE OPERATION 214 through an OPERATION 318. In this event, the modification of the hosts file is non-malicious. Specifically, the modified hosts file does not include a prohibited name unassociated with a known safe IP address, i.e., a malicious entry. Accordingly, the modified hosts file is allowed to be implemented in ALLOW IMPLEMENTATION OF MODIFIED HOSTS FILE OPERATION 214.

Referring again to FIG. 1, hosts file protection application 106 is in computer memory 114. As used herein, a computer memory refers to a volatile memory, a non-volatile memory, or a combination of the two.

Although hosts file protection application 106 is referred to as an application, this is illustrative only. Hosts file protection application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client-server configuration, an embodiment of the present invention may be carried out using any suitable means and/or hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs (CDs), DVDs, ROM cards, floppy discs, magnetic tapes, computer hard drives, and servers on a network.

As illustrated in FIG. 1, this medium may belong to the computer system itself. However, the medium also may be removed from the computer system. For example, hosts file protection application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server computer system 130 is a portable computer, a workstation, a two-way pager, a cellular telephone, a digital wireless telephone, a personal digital assistant, a server computer, an Internet appliance, or any other device that includes components that can execute the hosts file protection functionality in accordance with at least one of the embodiments as described herein. Similarly, in another embodiment, host computer system 102 and/or server computer system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the hosts file protection functionality in accordance with one embodiment of the present invention can be implemented in a wide variety of computer system configurations. In addition, the hosts file protection functionality could be stored as different modules in memories of different devices. For example, hosts file protection application 106 could initially be stored in server computer system 130, and then as necessary, a portion of hosts file protection application 106 could be transferred to host computer system 102 and executed on host computer system 102. Consequently, part of the hosts file protection functionality would be executed on processor 134 of server computer system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, hosts file protection application 106 is stored in memory 136 of server computer system 130. Hosts file protection application 106 is transferred over network 126 to memory 114 in host computer system 102. In this embodiment, network interface 138 and I/O interface 110 would include analog modems, digital modems, or a network interface card. If modems are used, network 126 includes a communications network, and hosts file protection application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:
   detecting modification of a hosts file, said modification creating a modified hosts file;
   stalling implementation of said modified hosts file;
   determining if said modification is malicious comprising:
     parsing said modified hosts file to create a parsed hosts file comprising a plurality of entries, each entry comprising a host name and an associated IP address; and
     for each entry in said parsed hosts file:
       determining whether said host name is a prohibited name;
       determining whether said associated IP address is a known safe IP address upon a determination that said host name is said prohibited name; and
       determining that said modification is malicious upon a determination that said associated IP address is not said known safe IP address; and
   restoring said hosts file upon a determination that said modification is malicious.

2. The method of claim 1 wherein said hosts file comprises host names and associated IP addresses.

3. The method of claim 1 further comprising hooking a file system of a host computer system comprising said hosts file, said hooking comprising redirecting control to a hosts file protection application upon writing to said hosts file.

4. The method of claim 1 further comprising creating a copy of said hosts file, said restoring comprising replacing said modified hosts file with said copy of said hosts file.

5. The method of claim 1 wherein said detecting modification of said hosts file comprises transferring control to a hosts file protection application upon writing to said hosts file.

6. The method of claim 1 wherein said stalling implementation of said modified hosts file comprises preventing applications from using said modified hosts file.

7. The method of claim 6 wherein said preventing applications from using said modified hosts file comprises preventing control from being transferred to said applications.

8. The method of claim 1 wherein said determining if said modification is malicious comprises determining whether said modified hosts file comprises a prohibited name.

9. The method of claim 8 wherein said prohibited name comprises a name of a security vendor site.

10. The method of claim 9 wherein said security vendor sites comprise Web sites and FTP sites.

11. The method of claim 9 wherein said security vendor sites comprise sites for receiving updates to security products.

12. The method of claim 9 wherein said security vendor sites comprise sites for receiving new virus definitions.

13. The method of claim 9 wherein said security vendor sites comprise sites for receiving updates to operating systems or applications.

14. The method of claim 8, wherein upon a determination that said modified hosts file comprises said prohibited name, said method further comprising determining whether said modification is a known false positive.

15. The method of claim 14 wherein said determining whether said modification is a known false positive comprises determining whether an IP address associated with said prohibited name is a known safe IP address.

16. The method of claim 15 wherein said determining whether said modification is a known false positive comprises generating a query to determine said IP address.

17. The method of claim 1 further comprising implementing said modified hosts file upon a determination that said modification is non-malicious.

18. The method of claim 17 wherein said implementing comprises allowing applications to use said modified hosts file.

19. The method of claim 1 wherein said restoring said hosts file comprises removing a malicious entry from said modified hosts file.

20. The method of claim 1 further comprising providing a notification that said hosts file has been restored.

21. A method comprising:
  detecting modification of a hosts file, said modification creating a modified hosts file;
  stalling implementation of said modified hosts file;
  parsing said modified hosts file to create a parsed hosts file;
  reading an entry in said parsed hosts file, said entry comprising a host name and an associated IP address;
  determining whether said host name is a prohibited name;
  determining whether said associated IP address is a known safe IP address upon a determination that said host name is said prohibited name; and
  restoring said hosts file upon a determination that said associated IP address is not said known safe IP address, wherein upon a determination that said host name is not said prohibited name, said method further comprising:
  determining whether said entry is a last entry of said parsed hosts file; and
  selecting a next entry from said parsed host file upon a determination that said entry is not said last entry of said parsed host file.

22. A method comprising:
  detecting modification of a hosts file, said modification creating a modified hosts file;
  stalling implementation of said modified hosts file;
  parsing said modified hosts file to create a parsed hosts file;
  reading an entry in said parsed hosts file, said entry comprising a host name and an associated IP address;
  determining whether said host name is a prohibited name;
  determining whether said associated IP address is a known safe IP address upon a determination that said host name is said prohibited name; and
  restoring said hosts file upon a determination that said associated IP address is not said known safe IP address, wherein upon a determination that said associated IP address is said known safe IP address, said method further comprising determining whether said entry is a last entry of said parsed hosts file.

23. A system comprising:
  a means for detecting modification of a hosts file, said modification creating a modified hosts file;
  a means for stalling implementation of said modified hosts file;
  a means for determining if said modification is malicious comprising:
    a means for parsing said modified hosts file to create a parsed hosts file comprising a plurality of entries, each entry comprising a host name and an associated IP address; and
    for each entry in said parsed hosts file:
      a means for determining whether said host name is a prohibited name;
      a means for determining whether said associated IP address is a known safe IP address upon a determination that said host name is said prohibited name; and
      a means for determining that said modification is malicious upon a determination that said associated IP address is not said known safe IP address; and
  a means for restoring said hosts file upon a determination that said modification is malicious.

24. A computer-program product comprising a computer readable storage medium containing computer program code comprising:
  a hosts file protection application for detecting modification of a hosts file, said modification creating a modified hosts file;
  said hosts file protection application further for stalling implementation of said modified hosts file;
  said hosts file protection application further for determining if said modification is malicious comprising:
    parsing said modified hosts file to create a parsed hosts file comprising a plurality of entries, each entry comprising a host name and an associated IP address; and
    for each entry in said parsed hosts file:
      determining whether said host name is a prohibited name;
      determining whether said associated IP address is a known safe IP address upon a determination that said host name is said prohibited name; and
  determining that said modification is malicious upon a determination that said associated IP address is not said known safe IP address; and
  said hosts file protection application further for restoring said hosts file upon a determination that said modification is malicious.

25. A computer system comprising:
  a memory having stored therein a hosts file protection application; and
  a processor coupled to said memory, wherein execution of said hosts file protection application generates a method comprising:

detecting modification of a hosts file, said modification creating a modified hosts file;

stalling implementation of said modified hosts file;

determining if said modification is malicious comprising:

parsing said modified hosts file to create a parsed hosts file comprising a plurality of entries, each entry comprising a host name and an associated IP address; and for each entry in said parsed hosts file:

determining whether said host name is a prohibited name;

determining whether said associated IP address is a known safe IP address upon a determination that said host name is said prohibited name; and determining that said modification is malicious upon a determination that said associated IP address is not said known safe IP address; and restoring said hosts file upon a determination that said modification is malicious.

\* \* \* \* \*